US008390528B2

(12) United States Patent
Tuttle

(10) Patent No.: US 8,390,528 B2

(45) **Date of Patent: *Mar. 5, 2013**

(54) ELECTRONIC MONITORING SYSTEMS, SHIPMENT CONTAINER MONITORING SYSTEMS AND METHODS OF MONITORING A SHIPMENT IN A CONTAINER

(75) Inventor: John R. Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,946

(22) Filed: Jul. 11, 2011

(65) Prior Publication Data

US 2011/0273362 A1 Nov. 10, 2011

Related U.S. Application Data

(63) Continuation of application No. 12/631,643, filed on Dec. 4, 2009, now Pat. No. 7,978,147, which is a continuation of application No. 11/674,966, filed on Feb. 14, 2007, now Pat. No. 7,629,943.

(51) Int. Cl.
*H01Q 21/00* (2006.01)

(52) U.S. Cl. ........................................ 343/893; 343/725

(58) Field of Classification Search .................. 343/893, 343/872, 725; 340/539.26, 539.1, 572.1
See application file for complete search history.

(56) References Cited

U.S. PATENT DOCUMENTS 5,565,858 A 10/1996 Guthrie
6,927,688 B2 8/2005 Tice
7,098,784 B2 8/2006 Easley et al.
7,126,552 B2 10/2006 Locatelli et al.
7,339,482 B2 3/2008 Jaeger et al.
7,370,791 B2 5/2008 O'Dougherty et al.
7,429,953 B2 9/2008 Buris et al.
7,629,943 B2 12/2009 Tuttle
2007/0001809 A1 1/2007 Kodukula et al.
2007/0040682 A1 2/2007 Zhu et al.
2007/0205946 A1 9/2007 Buris et al.
2007/0267509 A1 11/2007 Witty et al.

FOREIGN PATENT DOCUMENTS

JP 11-313022 A 11/1999
WO 2005/057378 A2 6/2005

OTHER PUBLICATIONS

Written Opinion and International Search Report for International Application No. PCT/US2008/051271, Jun. 24, 2008.

*Primary Examiner* — Hoang V Nguyen

(74) *Attorney, Agent, or Firm* — Lerner, David, Littenberg, Krumholz & Mentlik, LLP

(57) ABSTRACT

A shipping container has a passive radio antenna element having internal and external antennas. A connector spanning the wall joins the two antennas. An internal communications device is disposed within the container and an external communications device is disposed external to the container. Another shipping container has a repeater element having internal and external antennas. A repeater unit spans the wall joining the two antennas. A communications device is disposed within the container and another communications device is disposed externally. RF signals are re-radiated by the antennas. Methodology includes emitting RF signals from a communication device disposed at a first location, receiving the signals through an antenna comprised by an antenna element, and re-radiating the signal from a second antenna comprised by the element, where the element spans the wall of a shipping container. The re-radiated signal is received by a second communications device disposed at a second location.

11 Claims, 5 Drawing Sheets

42
40
12
22
26
16
24
19
18
14
10
20
30
32

10
12
22
26
16
24
19
18
14
20
42a
40a
30a
32a 10a
12
22
24
55
16
19
18
14
40
30

ELECTRONIC MONITORING SYSTEMS, SHIPMENT CONTAINER MONITORING SYSTEMS AND METHODS OF MONITORING A SHIPMENT IN A CONTAINER

CROSS-REFERENCE TO RELATED APPLICATIONS

This application is a continuation of U.S. patent application Ser. No. 12/631,643, filed Dec. 4, 2009, to become U.S. Pat. No. 7,978,147, which is a continuation of U.S. patent application Ser. No. 11/674,966, filed Feb. 14, 2007, now U.S. Pat. No. 7,629,943, the disclosures of which are incorporated herein by reference.

TECHNICAL FIELD

The technical field is electronic monitoring systems, shipment monitoring systems and methods of monitoring a shipment.

BACKGROUND OF THE INVENTION

Electronic monitoring and control devices are utilized for purposes such as monitoring of shipment containers and may be utilized for detecting the presence of hazardous content such as radiation and/or explosive devices. Theoretically, interfacing of communication equipment to other electronic monitor equipment outside the shipping container may be done one of two ways: either by utilizing wired interfacing or by wireless interfacing. Due to the immense number of containers to be monitored, however, it is strongly preferable to utilize wireless interfacing. However, wireless interfacing can be problematic due to the use of metal-walled shipping containers such as steel inter-modal containers and aluminum airline freight containers, which reflect electric fields that are typically used in VHF, UHF and MW radio transmissions. Because these containers are closed after loading with freight, attempts to communicate by radio to and from radio equipment located within the container by radio equipment located outside the containers can be difficult. Transmission from equipment inside the container simply reflects from the metal floor, ceiling and walls, never reaching outside the container. Transmission from equipment outside the container reflects from outer metal of the container never reaching to the radio receiver located on equipment inside the container. Accordingly, it would be advantageous to develop methods and apparatus for enabling radio transmission into and out of metal containers.

DETAILED DESCRIPTION

Various systems and methods are disclosed for monitoring freight shipment utilizing a passive radio antenna element. Specifically, embodiments of the invention are described with respect to use in conjunction with metal shipping containers. It is to be understood, however, that the systems and methodology described can be utilized for other security and monitoring purposes and for containers which comprise in whole or in part materials other than metal.

Figure 1:
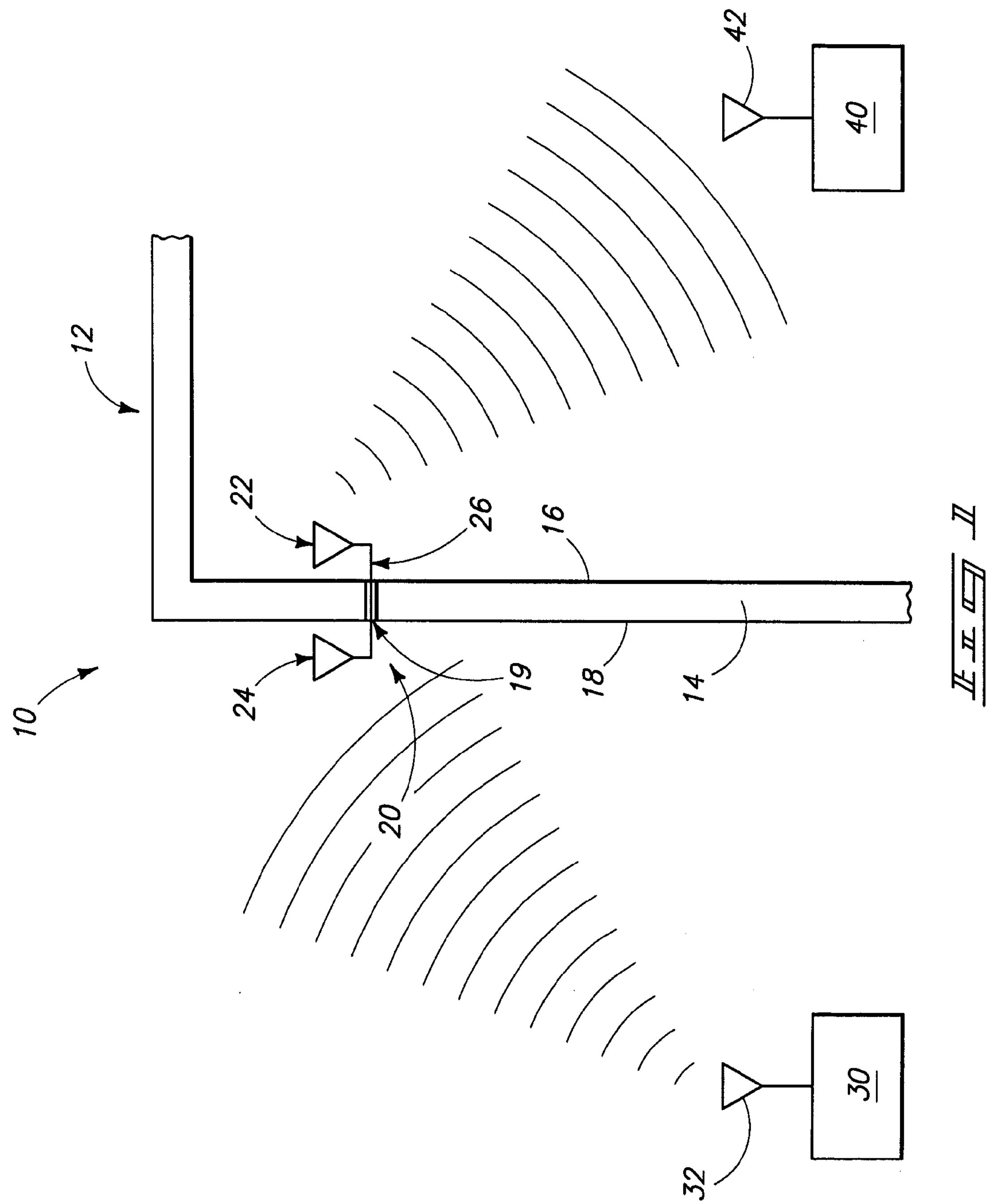
FIG. 1 is a diagram of a wireless communication system embodiment.

Embodiments of the disclosure utilize a passive radiator, a radio antenna element which does not have any wired input. The passive radio antenna element absorbs radio waves radiated from another active antenna element in close proximity and re-radiates it. An example of a system utilizing the passive radio antenna element is shown in FIG. 1. An electronic shipping monitoring system 10 is shown. A corner fragment of a metal-walled shipping container 12 is shown having a vertical wall 14. Container 12 can be, for example, a metal container for transport by air, sea, rail and/or truck.

Vertical wall 14 has a first surface 16 disposed within container 12 and an opposing second surface 18 which may be an exterior wall surface of the container. An opening 19 is shown passing through wall 14 near an upper corner of the container. It is to be understood that the depicted location of opening 19 is for purposes of illustration purposes only and such can be disposed at any desired location throughout the container, penetrating any portion of container forming a barrier between the interior and exterior thereof, including any exterior wall, junction of walls, door, lid, etc.

A passive radio antenna element 20 is shown disposed spanning wall 14 through opening 19. Passive radio antenna element 20 may include a first antenna 22 disposed proximate interior wall surface 16 and a second antenna 24 disposed proximate exterior wall surface 18. A connector 26 may span wall 14 through opening 19 to connect first antenna 22 with second antenna 24. Opening 19 may be configured to be relatively small in order to maintain security of the container's contents, structural integrity of the container and to keep out the elements. Any gap between connector 26 and wall 14 within gap 19 may be sealed with an appropriate non-conducting sealant such as silicone.

System 10, in an embodiment, may further include an external communication device 30 at a first position outside container 12 and may have an active antenna 32. An internal communication device 40 may be disposed at a second position within the container and may have an active antenna 42.

Utilizing the embodiment of the invention shown in FIG. 1, methodology of the invention can be performed by emitting an RF signal from a first location, re-radiating the RF signal through the passive antenna and receiving the re-radiated signal at a second location. Specifically, as shown in FIG. 1, an RF signal may be emitted from a transmitter comprised by external communication device 30 via active antenna 32. The signal can be radiated to be received by antenna 24. Such signal can then be re-radiated from antenna 22 and the re-radiated signal can be received by a receiver comprised by internal communication device 40 via active antenna 42.

In some embodiments, one or both of the antennas 22 and 24 are supported by the wall 14 or are elsewhere supported by the container. In some embodiments, the connector 26 is insulated relative to the wall 14 to avoid electrical coupling with the wall 14. For example, the entire length of the connector 26 may be insulated, the portion through opening 19 can be insulated, or some portion of the length of the connector 26 may be insulated. If some portion of the length of the connector 26 is insulated, that portion would be positioned in the opening 19. In some embodiments, the connector 26 is not insulated but the opening 19 has an insulator providing electrical insulation, and the connector passes through the insulator. In some embodiments, the opening 19 is sealed relative to the connector 26, e.g., with non-conductive material, after the connector 26 is caused to extend through the opening.

In some embodiments, the device 30 is a reader and the device 40 is an RFID tag. More particularly, the container may contain inventory and one or more RFID tags are supported by the inventory. RFID tags may be supported on individual items of inventory, or on pallets or other groupings of inventory. In some embodiments, an RFID tag may be included solely to identify the container 12.

One way to track objects is by affixing RFID tags to objects or groups of objects, and interrogating the RFID tags with an interrogator or reader to determine which objects are present in any particular location. RFID tags may be provided with unique identification numbers or codes in order to allow a reader to distinguish between multiple different tags. In some embodiments, the antennas 22 and 24 are used to enhance communications between RFID tags inside the container and a reader outside the container. In some embodiments, antennas 22 and 24 may be used to enhance communication between an interrogator or reader 30 and a transceiver 40 external to the container, where the transceiver may be connected to additional external devices (not shown) such as a controller, second reader, or network interface.

In some embodiments, the device 40 is an RFID tag that uses magnetic coupling for power. The devices may be entirely passive (have no power supply), which results in a small and portable package.

In some more particular embodiments, the device 40 is an RFID tag that complies with EPCglobal Class 1, Generation 2 standards. EPCglobal is a standard setting organization that is developing standards for electronic product codes to support the use of RFID technology. One of their standards, called Class 1, Generation 2 (also known as "Gen 2") applies to passive RFID systems.

In other embodiments, the device 40 is an active RFID tag, which includes its own source of power, such as a battery.

Figure 4:
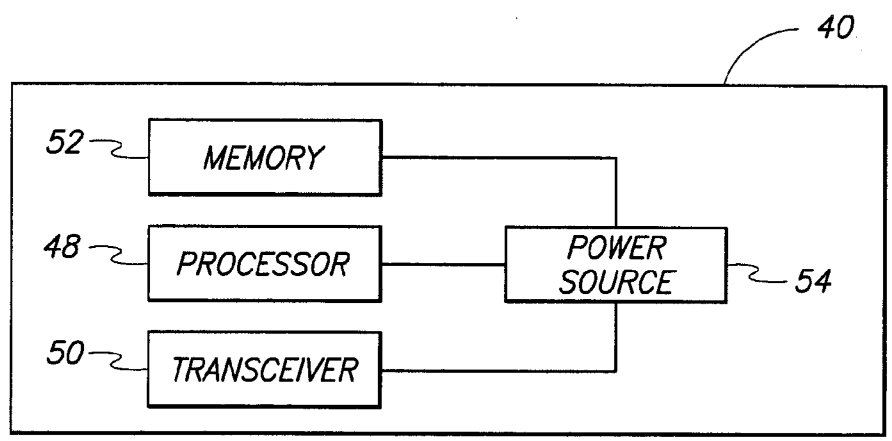
FIG. 4 is a block diagram of a component of the wireless communication system of another embodiment.

In some embodiments, the device 40 is an RFID tag that includes (see FIG. 4) a processor 48, and a transceiver coupled to the processor 48. In these embodiments, the device 30 is a reader. The RFID tag responds to commands issued by the reader and received by the transceiver 50. The processor 48 processes received commands and the processor 48 causes the transceiver 50 to transmit a reply. In some embodiments, the reply is backscattered. Memory 52 is also included and, while shown as a separate block in FIG. 4, could be included in the processor 48 in some embodiments. Power is supplied by a power source 54 which may be a magnetic coil, battery, or other type of power source.

Figure 2:
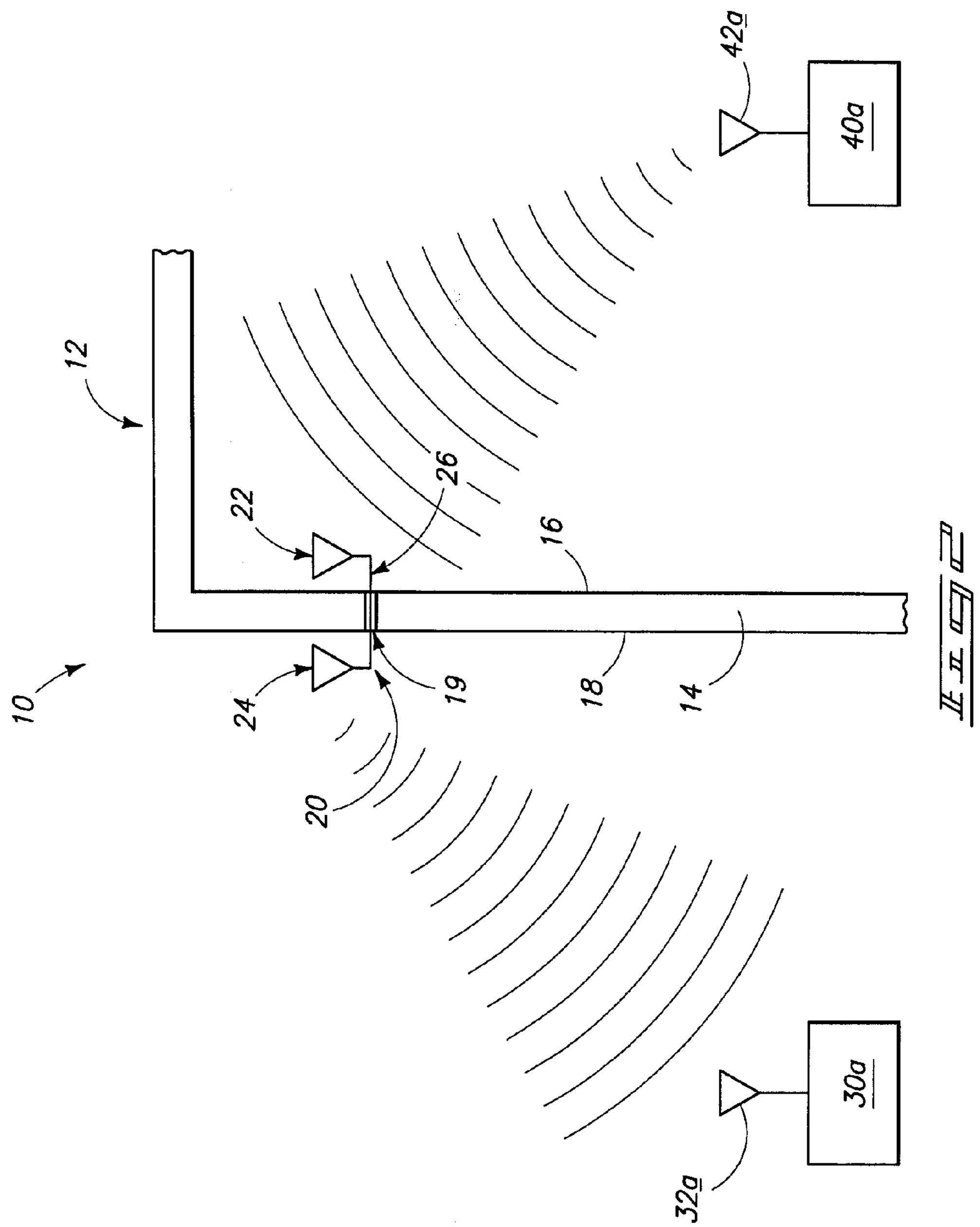
FIG. 2 is a diagram of another wireless communication system embodiment.

Referring next to FIG. 2, such shows an alternative embodiment where an initial RF signal is emitted from an internal communication device 40*a* via an active antenna 42*a*. The initial RF signal is received by first antenna 22 and is re-radiated by second antenna 24. The re-radiated signal is received by an external communication device 30*a* by way of active antenna 32*a*. Accordingly, the passive radiator systems of the invention may be utilized either for receiving a signal emitted from within the container and re-radiating the signal to a receiver located external to the container, or alternatively may receive an external signal and re-radiate the signal to a monitoring device within container 12.

Figure 3:
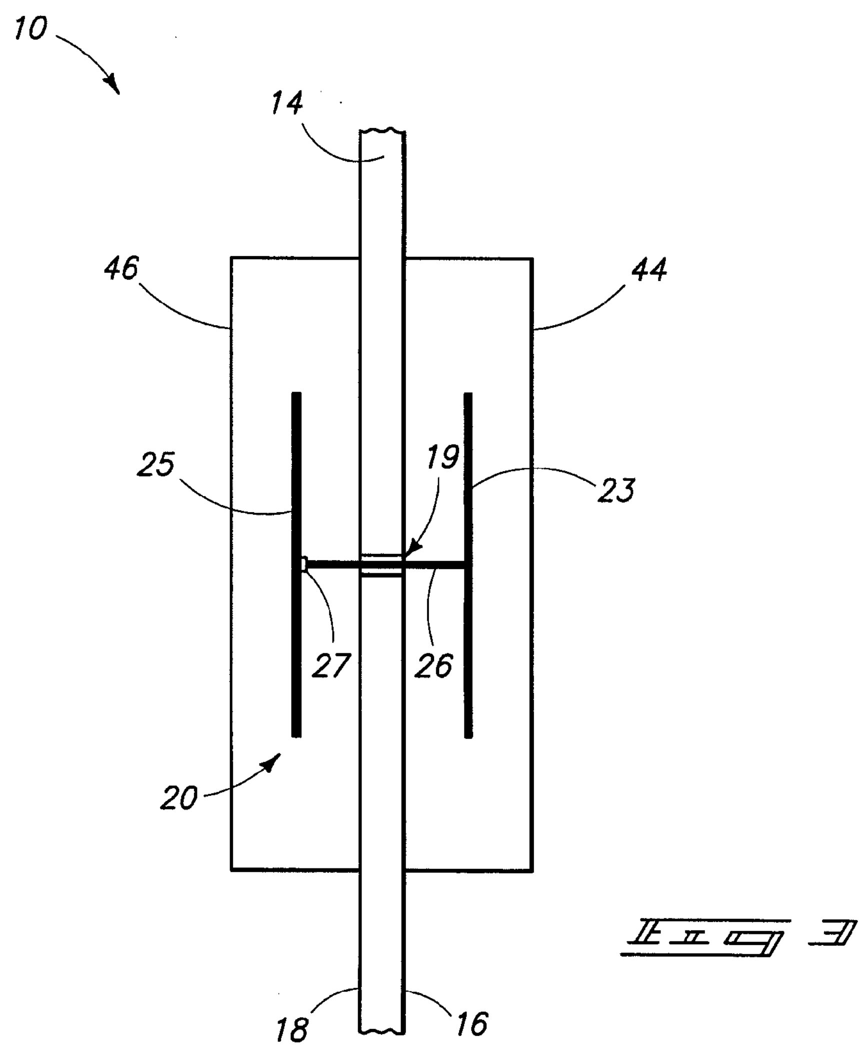
FIG. 3 is an enlarged fragmentary diagram showing a portion of another wireless communication system embodiment.

Further embodiments of the present invention are discussed with reference to FIG. 3. As shown in FIG. 3, passive antenna element 20 may have a first antenna 23 and a second antenna 25, each of which may be patch antennas. Alternatively, the first and second antennas may be of differing types (not shown). For example, either external antenna 25 or internal antenna 23 may be a dipole antenna while the other antenna is a patch antenna. Alternatively, each may be a dipole antenna. Antennas 23 and 25 may have the same polarization or can have differing polarization (e.g. linear-linear, circular-linear). The two antennas can have the same orientation or can have differing orientations (e.g. up-up, up-sideways). The two antennas can have the same gain or can have different gains. Further, the two antennas can have the same directionality or can have differing directionalities. As further shown in FIG. 3, connector 26 can be configured to have at least one coaxial connector 27. In particular instances, connector 26 will have a coaxial connector at each end (not shown).

In some embodiments, the connector 26 is insulated relative to the wall 14 to avoid electrical coupling with the wall 14.

One or more antenna housings 44, 46 can be provided to cover all or a portion of antennas 23 and 25. Such can be mounted to interior surface 16 and/or exterior surface 18. Housing 44, 46 may be fabricated of a material which does not interfere with RF energy. In particular instances, one or both of housings 44 and 46 may be configured to simulate a vent cap or other structure to render camouflage for the antenna. When such camouflage is desirable, to mount the passive antenna and corresponding housing may be mounted relatively high on the container wall to better simulate a vent cap appearance.

Figure 5:
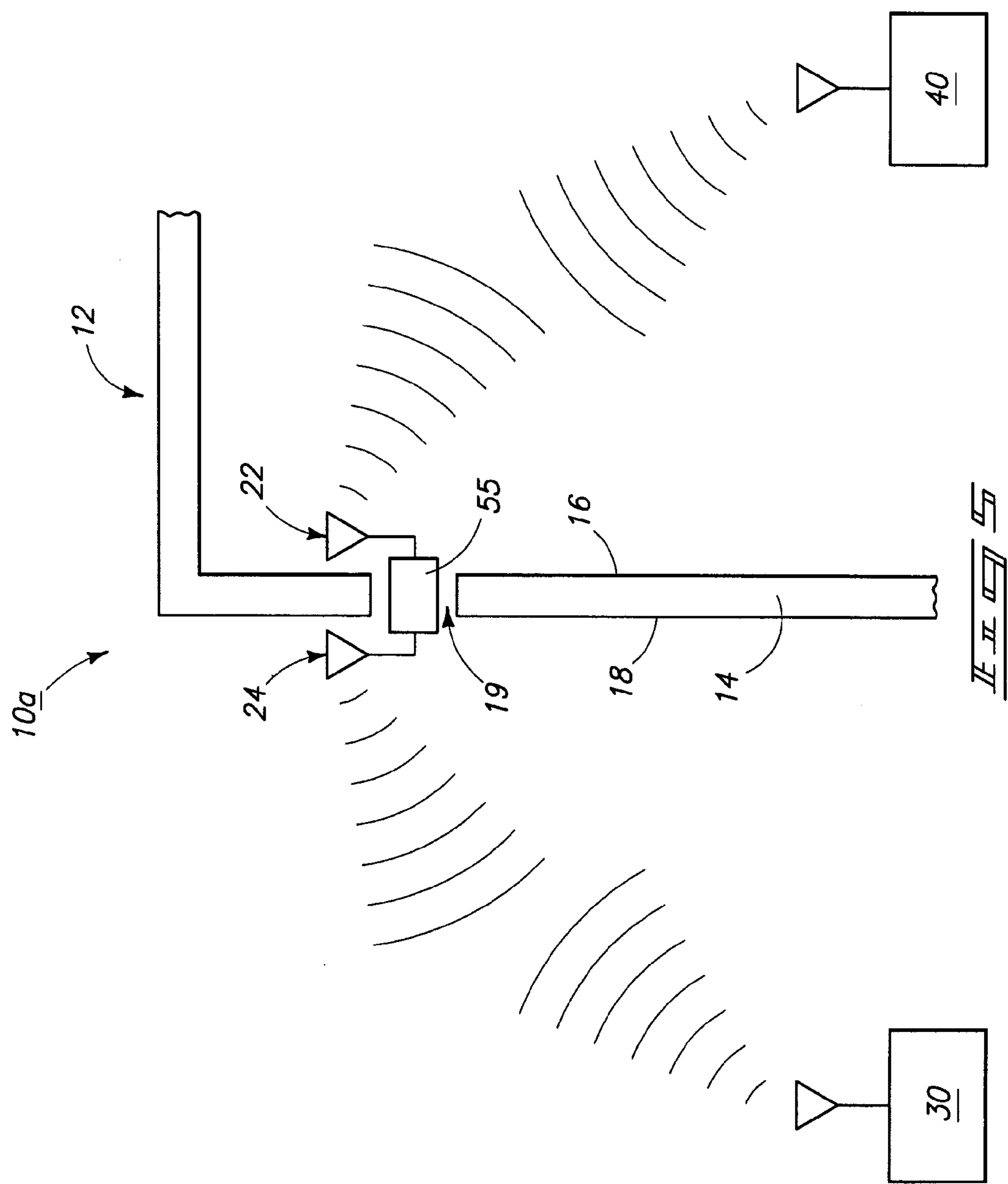
FIG. 5 is a diagram of another wireless communication system embodiment.

An additional embodiment is described with reference to FIGS. 5-6. Referring initially to FIG. 5, a repeater system 10*a* is shown having a repeater element in place of the passive antenna element described in previous embodiments. A repeater unit 55 may be disposed between antennas 22 and 24 thereby physically connecting the two antennas to span wall 14. Repeater 55 may be configured to allow signals transmitted from both internal communications device 40 and external communications device 30 to be retransmitted by antennas 24 and 22 respectively. Repeating system 10*a* may thereby serve as a relay system to bi-directionally reradiate from transmitting antennas 22 and 24. The various antenna types, configurations, housings, etc. described with respect to the passive antenna communication systems above may be equally employed with respect to the present repeater system.

Figure 6:
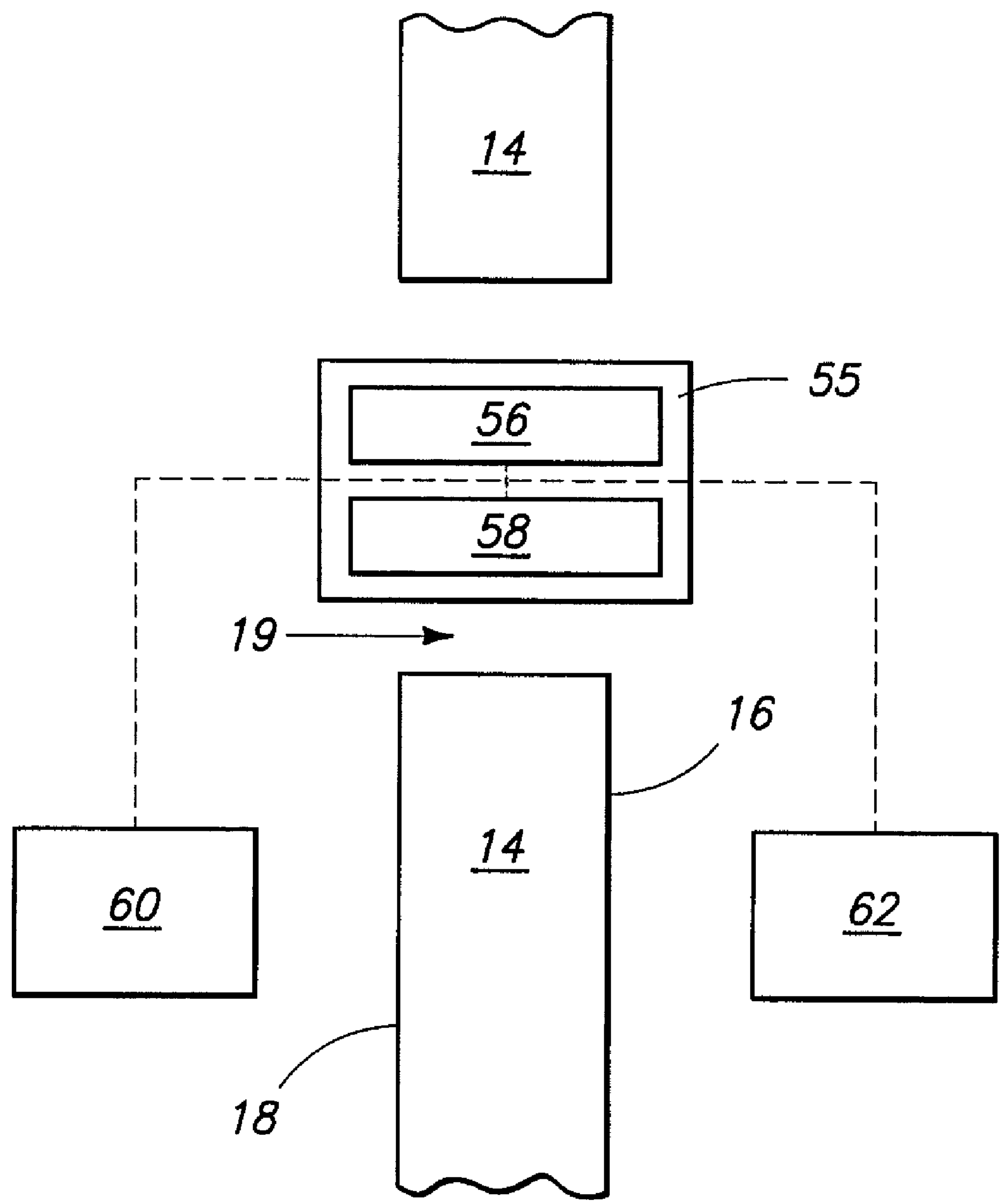
FIG. 6 is an enlarged fragmentary diagram showing alternative power source placements for the embodiment depicted in FIG. 5.

FIG. 6 illustrates various positions at which a repeater power supply may be located. Such power supply may be a battery, for example, and may be located at an internal location 62 relative to the shipping container or may be external 60 relative to the shipping container. Alternatively, a battery 58 may be provided within the repeater unit 55 along with repeater circuitry 56. Alternative electric connection routes for each of the three battery positions are illustrated by dashed lines.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. An electronic monitoring system, comprising:

an external communications device for being disposed external to a container;

an internal communications device for being disposed within the container; and a passive radio antenna element comprising a first antenna for being disposed within the container, a second antenna for being disposed external to the container, and a connector for spanning a wall of the container, the connector joining the first and second antennas, wherein at least a portion of the connector is configured to be insulated from the wall.

2. The system of claim 1, wherein the first and second antennas are of differing polarization relative to one another.

3. The system of claim 1, wherein the first and second antennas are of the same polarization relative to one another.

4. The system of claim 1, wherein the first and second antennas are the same antenna type relative to one another.

5. The system of claim 1, wherein the first and second antennas are differing antenna types relative to one another.

6. The system of claim 1, wherein the first and second antennas have the same orientation relative to one another.

7. The system of claim 1, wherein the first and second antennas have different orientations relative to one another.

8. The system of claim 1, wherein the first and second antennas are positioned in the same direction relative to one another.

9. The system of claim 1, wherein the first and second antennas are positioned in different directions relative to one another.

10. The system of claim 1, wherein the first and second antennas have the same gain relative to one another.

11. The system of claim 1, wherein the first and second antennas have different gains relative to one another.

* * * * *